United States Patent [19]

Walton et al.

[11] Patent Number: 5,032,048
[45] Date of Patent: Jul. 16, 1991

[54] QUICK-FASTENING NUT

[75] Inventors: John N. Walton, Whitley Bay; David Campbell, Ashington, both of England

[73] Assignee: Hedley Purvis Limited, Morpeth, England

[21] Appl. No.: 550,500

[22] Filed: Jul. 10, 1990

[30] Foreign Application Priority Data

Jul. 11, 1989 [GB] United Kingdom ............ 15844

[51] Int. Cl.$^5$ ............................................. F16B 37/08
[52] U.S. Cl. .................................... 411/433; 411/270; 74/424.8 A
[58] Field of Search ............ 411/265, 266, 267, 270, 411/433, 935, 935.1; 74/424.8 A

[56] References Cited

U.S. PATENT DOCUMENTS

| | | | |
|---|---|---|---|
| 950,431 | 2/1910 | Bradford | 74/424.8 A |
| 3,151,653 | 10/1964 | Zahodiakin | 411/270 |
| 3,157,215 | 11/1964 | Zahodiakin | 411/270 |
| 3,352,341 | 11/1967 | Schertz | 411/270 |
| 4,378,187 | 3/1983 | Fullerton | 411/433 |

Primary Examiner—Neill R. Wilson
Attorney, Agent, or Firm—Cushman, Darby & Cushman

[57] ABSTRACT

A quick-fastening nut for location on an associated bolt comprises a plurality of internally-threaded, arcuate segments each including a part frusto-conical portion, and guide means reacting between the segments whereby the segments can be moved radially towards and away from one another between inoperative positions displaced outwardly of concentricity and operative positions substantially concentric with one another and whereby a frusto-conical surface is presented by the portions. The nut further comprises releasable means for retaining the segments in their operative positions, the arrangement being such that, in use, the frusto-conical surface defined by the portions engages a correspondingly-shaped mating surface of a component, such as the piston of a hydraulic bolt tensioner or a washer, bounding the bolt, relative axial movement between the nut and the component urging the segments radially inwardly into positive threaded engagement with the bolt.

6 Claims, 3 Drawing Sheets

QUICK-FASTENING NUT

BACKGROUND OF THE INVENTION

This invention relates to quick-fastening nuts and has particular, though not exclusive, application to reaction nuts associated with hydraulic bolt tensioning tools.

A bolt tensioning tool is essentially a hydraulic jack positioned over a nut and bolt assembly with the bolt extending centrally through the tool. In order to apply a load t the bolt, the tensioning tool must react against a nut screwed onto the bolt above the tool.

The length of the portion of the bolt protruding above the tool can be significant and, particularly in restricted and/or hazardous environments, such as underwater or in the nuclear industry, screwing of the reaction nut onto or from the bolt can be a time consuming and exhausting procedure, especially on larger diameter bolts with fine threads.

There are numerous other situations where two components are joined together by one or more nut and bolt assemblies and in which the free end extent of the bolt protrudes some distance beyond the associated component whereby it is necessary to screw the nut over a considerable distance before the joint is effected. Again, this can prove a time consuming exercise.

In order to overcome this problem, it has been proposed, for example in U.S. Pat. No. 4083288, to provide a split nut comprising two half nuts which can be located on a bolt at any axial position therealong, the split nut being provided with a conical surface thereon for cooperation with a complementary recess in a washer or other workpiece. On tightening, the components of the split nut are held together and in threaded engagement with the bolt by co-operation between the conical surface thereon and the recess in the workpiece.

This concept has been applied to hydraulic bolt tensioners, for example as disclosed in U.S. Pat. No. 4438901 and UK patent specification no. 2143608 in which the puller of the tensioner incorporates a collet consisting of a plurality of segments.

A hydraulic bolt tensioner incoporating a simplified puller in the form of a split nut provided with a cam surface thereon for engagement by a complementary recess in the piston of the hydraulic piston-cylinder assembly is disclosed in UK patent specification no. 2193549.

These known split nuts all suffer from the major disadvantage that they initially require the application thereto of an external radially-inwardly directed force to maintain threaded engagement with the associated bolt — i.e. in the absence of such a force, the components of the split nut, being separate from one another, become disengaged from the bolt.

Thus it will be appreciated that it is very difficult, if not impossible, to use such split nuts in upside down or even horizontal situations, while, in the application of these known split nuts to hydraulic bolt tensioners in such inverted or horizontal situations, it is necessary to hold onto both the tensioner and the nut until positive cooperation between the piston and the nut has been effected.

A split nut comprises at least two segments and it is essential that the segments actually associated with one another are combined to comprise a given split nut — using other than the correct segments in combination with one another can lead to problems in matching the threads of the segments.

With the known arrangements, particularly in mass production of the split nuts in question and because of the entirely separate nature of the segments, it is easy to mismatch the segments and to end up with a nut comprising incompatible segments.

SUMMARY OF THE INVENTION

It is an object of the invention to provide a nut capable of achieving an operative or locking position on an asssociated bolt quickly and without the aforementioned problems associated with the known arrangements.

According to the present invention there is provided a quick-fastening nut for location on an associated bolt, the nut comprising a plurality of internally-threaded, arcuate segments each including a part frusto-conical surface thereon and guide means reacting therebetween, whereby the segments are guided for radial movement relative to one another between inoperative positions displaced radially outwardly of concentricity and operative positions in which the segments are substantially concentric and the nut presents a frustoconical surface thereto, the nut further comprising releasable means for retaining the segments in said operative positions, the arrangement being such that, in use, the frusto-conical surface of the nut engages a correspondinglyshaped mating surface of a component bounding the associated bolt, relative axial movement between the nut and said component serving to urge the segments of the nut radially inwardly into positive threaded engagement with the bolt.

It will be appreciated that the guide means reacting between the segments of a nut ensure that the segments of a given nut are retained in association with each other and that a continuous, mating thread is provided by the nut, while the provision of the releasable means for retaining the segments in their operative positions enables a nut to be located on a bolt at any axial point therealong to make initial threaded engagement therewith without the requirement for any external radial force to retain the nut in said initial threaded engagement with the bolt.

In one embodiment of the invention, the segments are resiliently urged into said inoperative positions, for example by coil springs reacting between adjacent segments.

Preferably the nut comprises, for each pair of segments, one or more guide pins along which the segments are slidable relative to one another between their inoperative positions and their operative positions.

Some of the guide pins may have recesses provided therein, the releasable retaining means each comprising a bearing member, for example a ball bearing, resiliently biased towards the associated guide pin to be received in said recess when the segments are in their operative positions.

In a preferred embodiment of the invention, the nut comprises two segments each of generally semi-circular shape in transverse section, a pair of guide pins being provided, one adjacent each end of the diameters of the segments and each extending perpendicular to said diameters.

Conveniently the guide pins are each mounted on, to project from, one of the segments, the other segment being provided with corresponding guide channels therein and carrying the releasable retaining means.

Alternatively, however, each segment may carry one of the guide pins and be provided with a corresponding guide channel for the other guide pin and releasable retaining means for co-operation with the other guide pin.

DESCRIPTIONS OF THE PREFERRED EMBODIMENTS

Figure 1:
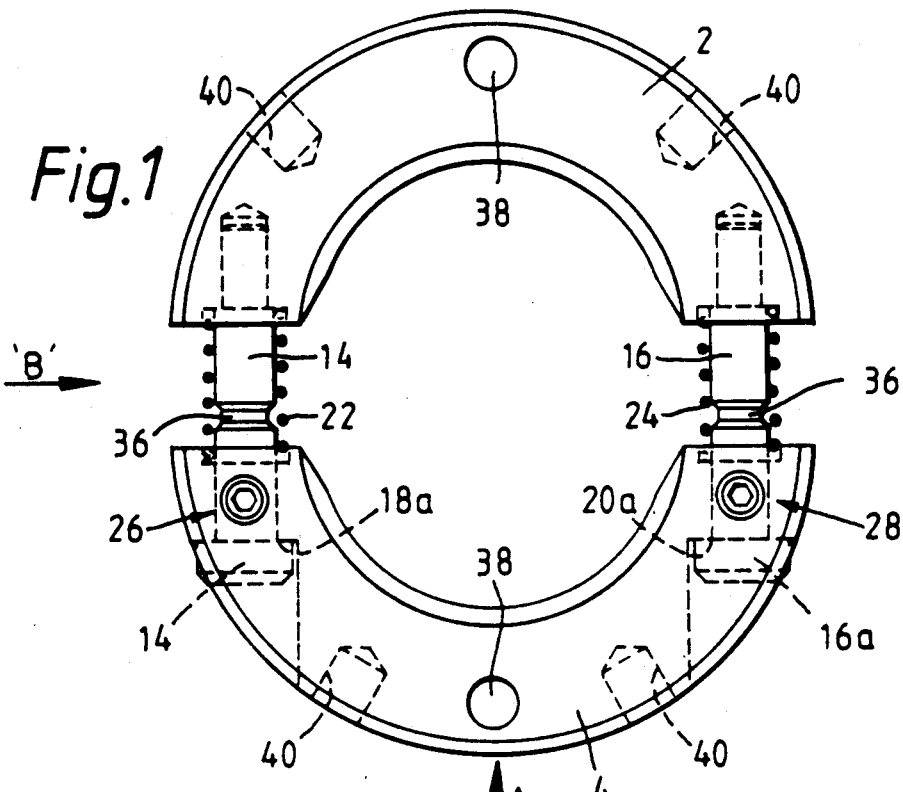
FIG. 1 is a plan view from above of a nut according to the invention.
Figure 2:
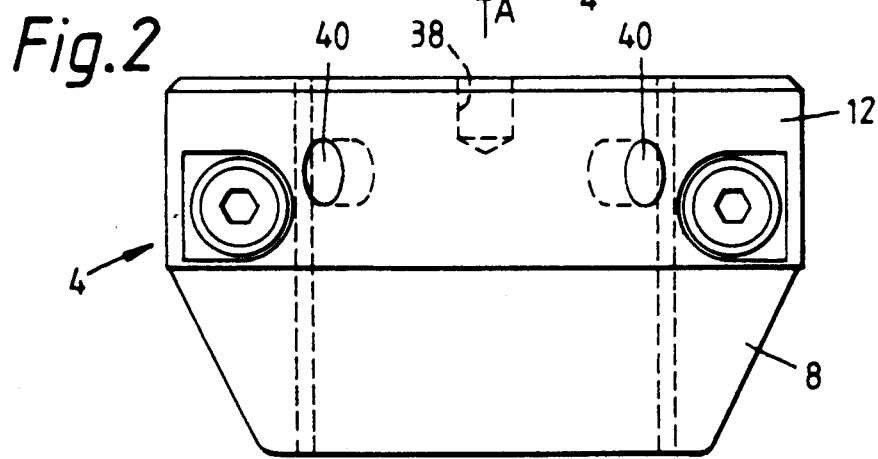
FIGS. 2 and 3 are views in the direction of arrows 'A' and 'B' respectively in FIG. 1, and FIG. 4 and 5 show, partly in vertical section, two applications of the nut according to the invention.
Figure 3:
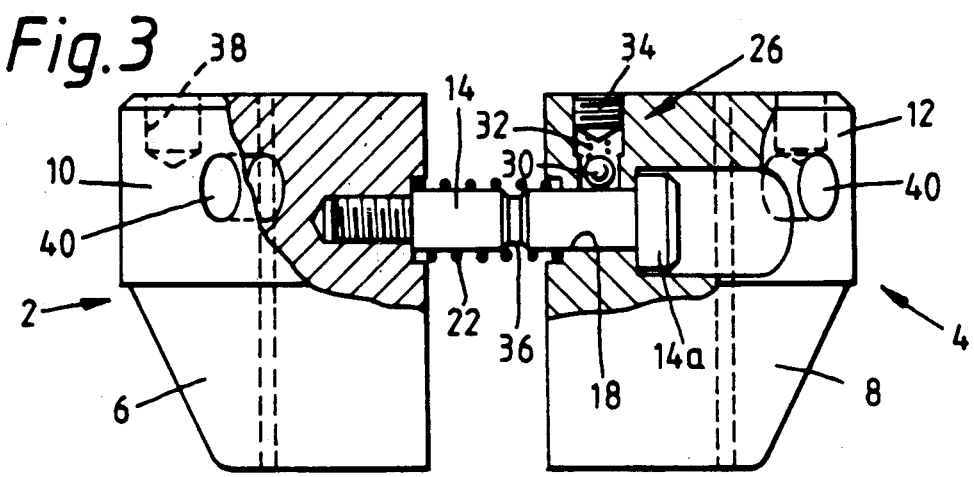

Referring to FIGS. 1 to 3 there is shown a quickfastening nut according to the invention comprising a pair of opposed, internally threaded segments 2,4 the segments 2,4 including lower portions 6,8 respectively having downwardly and inwardly tapering outer surfaces of generally semifrusto-conical appearance and upper portions 10,12 respectively of generally semicylindrical shape.

A pair of guide pins 14,16 are secured to and project outwardly respectively from each end face of, the segment 2, the pins projecting parallel with one another in a direction perpendicular to the bounding diameter of the segment 2.

A pair of corresponding channels 18,20 are formed in the segment 4, the guide pins 14,16 being received within said channels whereby the segments 2,4 are slidable relative to one another in the direction of said pins 14,16 between an inoperative position of the nut shown in the drawings and determined by abutment of heads 14a,16a, of the pins 14,16 with shoulders 18a,20a on the guide channels 18,20, and an operative position of the nut in which the end faces of the segments 2,4 are positioned closely adjacent to, but slightly spaced from, one another.

The segments 2,4 are resiliently urged towards their inoperative positions by means of coil springs 22,24 mounted on the guide pins 14,16 respectively and reacting between the end faces of the segments 2,4.

Mounted in the segment 4, one for each of the guide pins 14,16, are a pair of releasable retaining means indicated generally at 26,28. Each retaining means 26,28 comprises a ball bearing 30 resiliently urged in a direction parallel with the central longitudinal axis of the nut by means of a coil spring 32 into engagement with the associated guide pin 14,16, the spring 32 reacting between a screwthreaded bolt 34 mounted in the segment 4 and the ball bearing 30.

Each guide pin 14,16 is provided with a circumferential groove 36 therein, the axial position of which along the associated guide pin 14,16 is such that, when the segments 2,4 are in their operative positions, the grooves 36 are located immediately below their associated bearings 30, the bearings 30 thus being resiliently urged by the springs 32 into the grooves 36 therebelow and retaining the segments 2,4 in said operative positions.

Each segment 2,4 is provided with an axially-extending aperture 38 in the upper surface thereof for the insertion therein of a suitable key or the like to facilitate separation of the segments from their operative positions to their inoperative positions, as well as a pair of radiallyextending toggle holes 40 for the insertion therein of a lever or the like to facilitate rotation of the nut on an associated bolt.

Figure 4:
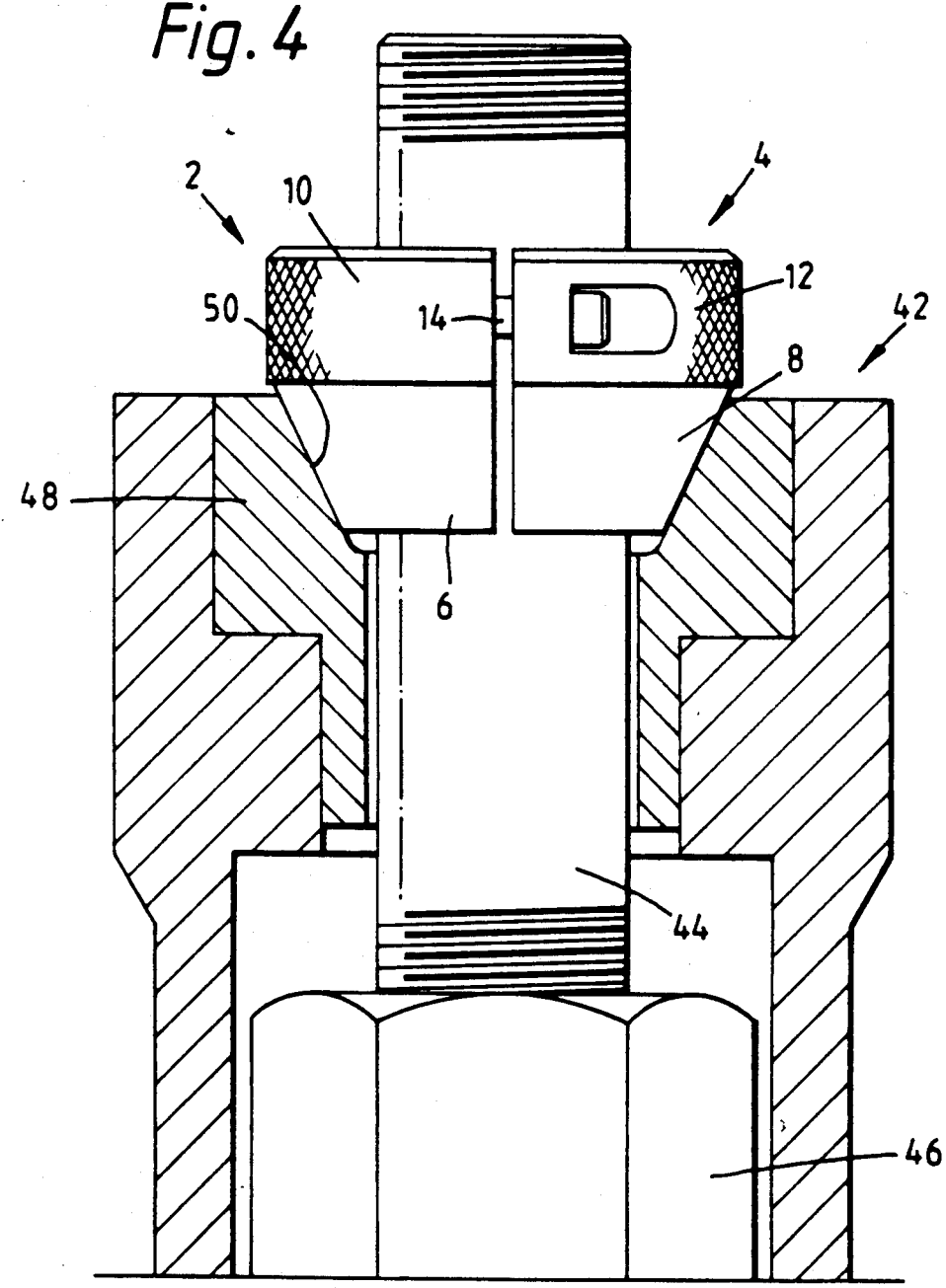

FIG. 4 illustrates a first application of the above described nut. In FIG. 4, there is shown a hydraulic bolt tensioning tool indicated generally at 42 and positioned on a threaded bolt 44 to be tensioned, the bolt 44 carrying an associated nut 46 to be tightened. The tool 42 may be of relatively conventional form other than that the end surface of the piston 48 includes an inwardly and downwardly tapering surface 50 conforming with that of the lower portions 6,8 of the segments 2,4 for reasons which will become apparent.

As mentioned above, actuation of the tensioning tool 42 requires the provision of a reaction nut on the bolt 44 above the tool. Use of a conventional reaction nut would require the nut to be screwed down the upper extent of the bolt 44 into engagement with the tool 42, which can be a timeconsuming and laborious exercise, particularly on long bolts with fine threads.

These problems are overcome by using the nut shown in FIGS. 1 to 3. More particularly, the nut in its inoperative position — i.e. with the segments 2,4 separated from one another — is positioned round the upper extent of the bolt 44 and is lowered into engagement with the upper regions of the tool 42, the lower regions of the tapering outer surfaces of the portions 6,8 of the segments 2,4 engaging with the upper regions of the tapering surface 50 of the piston 48 of the hydraulic tensioning tool 42.

The segments 2,4 are then moved towards their operative positions until the ball bearings 30 snap into the grooves 36 to determine said operative positions, in which positions the internal thread of the segments 2,4 is engaged with the thread of the bolt 44.

The nut is then screwed down the bolt 44, typically one or two turns, until the tapered surfaces of the portions 6,8 of the segments 2,4 mate with the frusto-conical surface 50 of the piston 48 as shown in FIG. 4, the nut then being in its reaction position.

On actuation of the tensioning tool 42, an axial force is applied to the reaction nut by way of the surface 50 of the piston 48, this force having a radially inward component which serves to urge the segments 2,4 inwardly into even more positive threaded engagement with the bolt 44 and which overcomes the radially outward forces, and consequential hoop stress, set up within the nut as a result of the tension between the threads of the nut and the bolt 44. In this respect, the angle between the tapered surfaces of the portions 6,8 of the segments 2,4 and the vertical surfaces is significantly less than the angle of the thread of the segments 2,4 and bolt 44.

Thus, the greater the force applied to the reaction nut on the bolt 44, the more positively the nut is secured on the bolt 44.

When it is desired to remove the reaction nut from the bolt 44, the nut is unscrewed sufficiently along the bolt 44 to disengage the tapering portions 6,8 of the segments 2,4 from the surface 50 of the piston 48 whereby the segments 2,4 can be separated from one another into their inoperative positions, for example by means of a key or keys located in the apertures 38. The nut is then lifted up and off the bolt 44.

Thus, there is provided a quick-fastening, quick-release nut enabling rapid location on and removal from even the longest of bolts and which is such that, under load, maximum thread engagement is effected with the associated bolt under all conditions — this is a useful safety feature in the event that, initially, the nut is not adequately engaged with the bolt by the operator.

Further, it will be appreciated that the described nut can be located on a downwardly or horizontally extending bolt without the application thereto of any external radial force, the retention of the segments in their operative positions by the releasable retaining means ensuring initial threaded engagement between the nut and the bolt regardless of the orientation of the bolt.

The provision of a split nut comprising two interconnected segments ensures a continuous thread to the nut.

Figure 5:
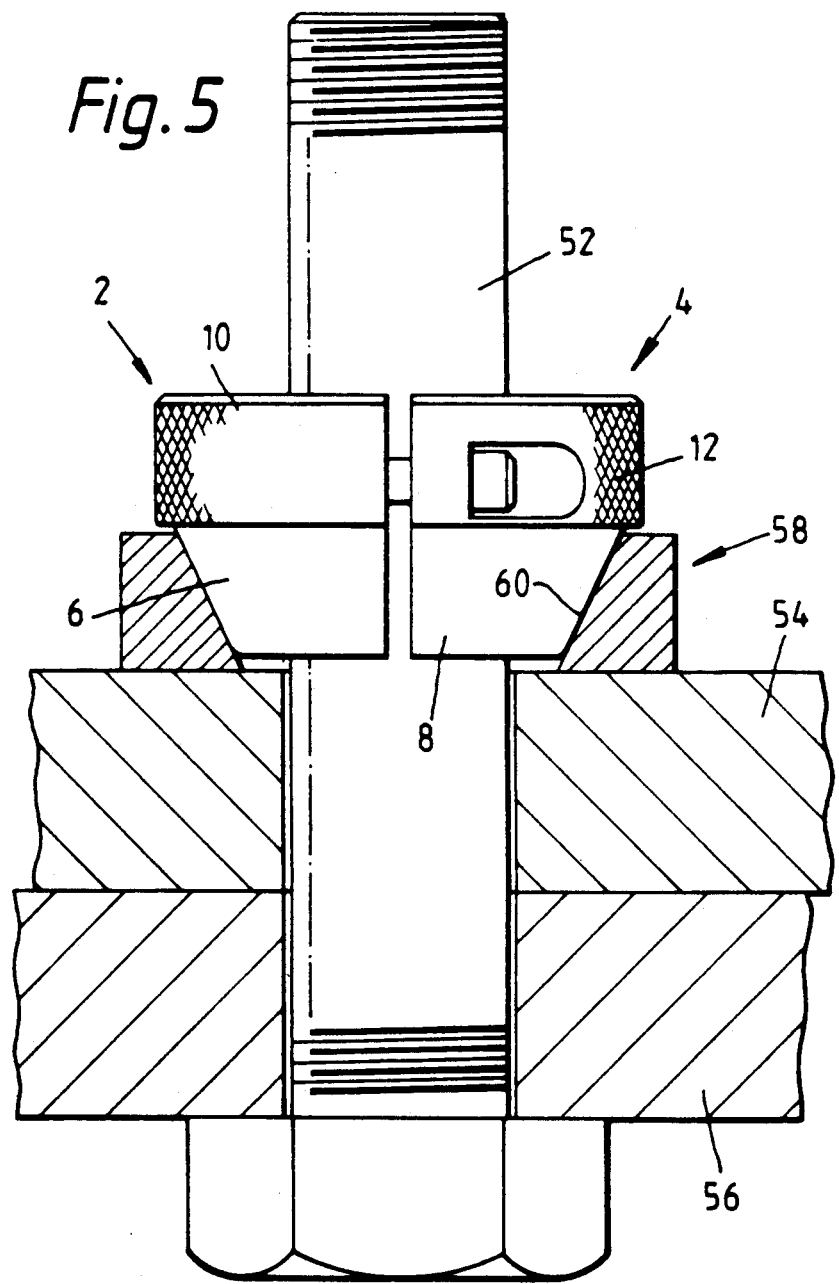

FIG. 5 shows an alternative application of the quick-fastening nut of the invention in which the nut is used in combination with a bolt 52 to effect the securing together of two components 54,56.

More particularly, the assembly includes, as well as the quick-fastening nut, an annular washer indicated generally at 58, the bore 60 of which is tapered to conform with the frusto-conical shape of the lower portions 6,8 of the segments 2,4, the washer 58 being interposed between the nut and the component 54.

In use, the bolt 52 is positioned through associated bores in the components 54,56 and the washer 58 is positioned on that part of the bolt 52 extending above the component 54. The nut in its inoperative condition is then located over the bolt 52 until the tapering lower regions of the lower portions 6,8 thereof abut the upper regions of the tapering bore 60 in the washer 58.

The segments 2,4 are moved to their operative positions as described with reference to FIG. 4 to engage the threads of the segments and the bolt 52 and the nut is screwed down the bolt 52 until the tapered surfaces of the portions 6,8 of the segments 2,4 mate with the bore 60 of the washer 58.

Securing together of the components 54,56 is then effected by rotating the bolt 52 relative to the nut. Again, the tighter the joint, the more positive the threaded engagement between the nut and the bolt 52.

The washer 58 may be integrally formed with the component 54 or the component 54 may be provided with a tapering recess therein equivalent to the bore 60, in which case the washer can be dispensed with.

The precise construction of the quick-fastening nut of the invention may be varied from that described above and illustrated in FIGS. 1 to 3 without departing from the scope of the invention. For example, the guide pins 14,16 may be mounted one on each of the segments 2,4 with the releasable retaining means 26,28 mounted in the other of the segments 2,4, while there may be more than two segments each with their associated guide pin or pins and retaining means. Other variations will be apparent to those skilled in the art.

It will also be appreciated that the nut of the invention has numerous applications other than those described and illustrated whenever nut and bolt assemblies are used, and in particular, when the extent of the bolt along which a conventional nut would have to be screwed is substantial, relatively inaccessible or contained within a hostile environment, such as sub-sea.

What we claim and desire to secure by Letter Patent is:

1. A quick-fastening nut for location on an associated bolt, and for co-operation with a component bounding the bolt and provided with a frusto-conical recess therein, the nut comprising:

a plurality of internally-threaded, arcuate segments each including a part frusto-conical surface thereon, guide means integral with the nut and reacting between the segments whereby the segments are guided for radial movement relative to one another between inoperative positions displaced radially outwardly of concentricity and permitting unimpeded passage therethrough of the bolt and operative positions in which the segments are substantially concentric and the nut presents a frusto-conical surface thereto, and releasable means for retaining the segments in the operative positions, wherein, in use, the frusto-conical surface of the nut engages the correspondinglyshaped mating recess of the component bounding the bolt, relative axial movement between the nut and the component serving to urge the segments of the nut radially inwardly into positive threaded engagement with the bolt.

2. A nut as claimed in claim 1 and comprising coil springs reacting between adjacent segments resiliently to urge the segments into said inoperative positions.

3. A nut as claimed in claim 2 and comprising, for each pair of segments, at least one guide pin along which the segments are slidable relative to one another between their inoperative positions and their operative positions.

4. A nut as claimed in claim 3 in which some at least of the guide pins define therein recesses, the releasable retaining means each comprising a bearing member resiliently biased towards the associated pin to be received in said recess when the segments are in their operative positions.

5. A nut as claimed in claim 4 and comprising two segments each of generally semi-circular shape in transverse section and having diameters thereto, a pair of guide pins being provided one adjacent each end of the diameters of the segments and each extending perpendicular to said diameters.

6. A nut as claimed in claim 5 in which the guide pins are each mounted on, to project from, one of the segments, the other segment defining therein corresponding guide channels and carrying the releasable retaining means.

* * * * *

UNITED STATES PATENT AND TRADEMARK OFFICE
CERTIFICATE OF CORRECTION

PATENT NO. : 5,032,048
DATED : July 16, 1991
INVENTOR(S) : WALTON, John N. , CAMPBELL David It is certified that error appears in the above-identified patent and that said Letters Patent is hereby corrected as shown below:

On the Title page

Please change:

Item [30] Foreign Application Priority Data . . . . 15844"

to

Item [30] Foreign Application Priority Data . . . . 8915844.8--

Signed and Sealed this

Twenty-ninth Day of December, 1992

*Attest:*

DOUGLAS B. COMER

*Attesting Officer*     *Acting Commissioner of Patents and Trademarks*